M. HUNGERFORD.
Water-Wheels.
No. 126,210.
Patented April 30, 1872.
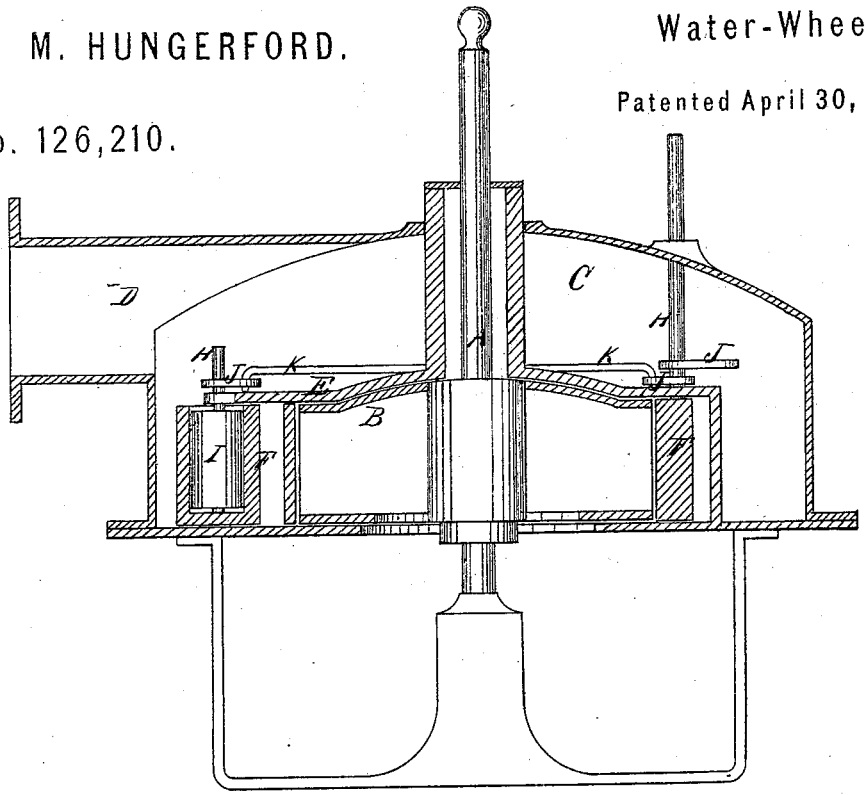
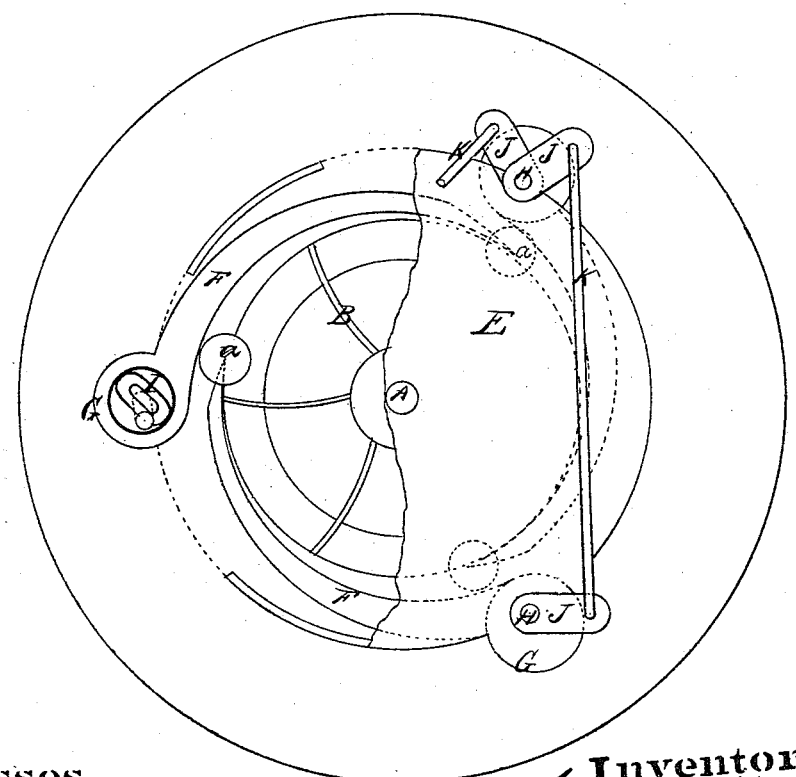
Witnesses
Geo H Strong
Benjn. C Fabre
Inventor
Morgan Hungerford
By his attys
Dewey & Co 126,210

UNITED STATES PATENT OFFICE.

MORGAN HUNGERFORD, OF SAN FRANCISCO, CALIFORNIA.

IMPROVEMENT IN WATER-WHEELS.

Specification forming part of Letters Patent No. 126,210, dated April 30, 1872.

SPECIFICATION.

*To all whom it may concern:*

Be it known that I, MORGAN HUNGERFORD, of city and county of San Francisco, State of California, have invented an Improvement in Water-Wheels; and I do hereby declare the following description and accompanying drawing are sufficient to enable any person skilled in the art or science to which it most nearly appertains to make and use my said invention or improvements without further invention or experiment.

The object of my invention is to provide an improvement in turbine and other water-wheels; and it consists of a novel arrangement of one or more adjustable gates, through which water is admitted to the wheel.

These gates are curved and can be operated from one shaft, so as to open or close all of them simultaneously, and thus regulate the amount of water admitted to the wheel according to the amount of the fall of water and the power required to be exerted by the wheel.

In the accompanying drawing, to which reference is made for a more complete explanation of my invention—

Figure 1 is a side sectional view. Fig. 2 is a plan.

A is the central shaft, to which the wheel B is secured, and C is the outer inclosing case, water being admitted through the passage D. E is a circular disk or plate extending around the journal of the shaft A, and forming the upper side of the chamber or case in which the wheel B revolves. The sides of the case are formed by adjustable curved gates F which, in the present case are three in number, as shown. These gates are formed in a curve, commencing at the outer or movable end and drawing gradually nearer to the wheel until at the extreme inner end they are secured by a lug or ear, $a$, to the top and bottom of the case, so as to keep its extremity to its place at all times. The outer or movable end of these gates has a motion about the pivot $a$ in their adjustment, so as to allow their movable ends to be brought nearer to or further from the periphery of the wheel. The outer end of each gate is cylindrical in form, and hollow, as at G, and has a shaft, H, passing vertically through it. Upon this shaft inside of the cylinder G is an eccentric or cam, I, of such a size that when the shaft is turned, the cam will sweep around the inside of the cylinder and cause the outer end of the gate to be moved out or in to open or close the passage, according to the direction in which the cam is turned. In order to bring the operating shaft H under the control of one lever, I secure an arm, J, to the upper end of each. Connecting rods K join the outer ends of two of these arms to the end of the third arm. The arms are secured to the shafts in such a position that the motion of all shall be similar either to open or close the gates. The third shaft above mentioned is carried up through the outer case, and to its upper end may be secured any suitable operating device as a lever or hand-wheel.

The operation will be as follows: Water being let in through the supply-passage D will rush through the passages formed by the position of the curved gates F, and striking the wheel will cause it to turn.

These adjustable gates are employed to contract or enlarge the water-passage leading to the wheel according to the head or fall of water to be obtained, as by reducing the size of the water-passages, and consequently the amount of water admitted to the wheel in proportion as the height of fall is increased, the power of any given amount of water can be proportionately increased.

Having thus described my invention, what I claim as new, and desire to secure by Letters Patent, is—

1. The curved adjustable gate F, when pivoted at $a$, and constructed with the hollow cylindrical movable head G, or an equivalent device, substantially as described.

2. In combination with the adjustable gate F, having the hollow cylindrical movable head G, I claim the shaft H and the operating cam I, substantially as herein described.

In witness that the above-described invention is claimed by me I have hereunto set my hand and seal.

MORGAN HUNGERFORD. [L. S.]

Witnesses:
GEO. H. STRONG,
BENJN. C. FABRE.